United States Patent [19]

Bernard et al.

[11] Patent Number: 4,948,613
[45] Date of Patent: Aug. 14, 1990

[54] MANUFACTURING PROCESS FOR PROCESSED CHEESES WITH AN ORIGINAL TEXTURE AND PROCESSED CHEESE OBTAINED BY THIS PROCEDURE

[75] Inventors: Jean-Yves Bernard, Lons Le Saulnier; Jacques Daurelles, Voiteur, both of France

[73] Assignee: Fromageries Bel, Paris, France

[21] Appl. No.: 156,143

[22] Filed: Feb. 16, 1988

[30] Foreign Application Priority Data

Feb. 13, 1987 [FR] France ............................ 87 01879

[51] Int. Cl.$^5$ ............................................. A23C 19/09
[52] U.S. Cl. ..................................... 426/564; 426/582
[58] Field of Search ................... 426/564, 582, 36, 38, 426/39, 40, 61, 63

[56] References Cited

U.S. PATENT DOCUMENTS

| | | |
|---|---|---|
| 1,639,828 | 8/1927 | Wheeler et al. ................... 426/511 |
| 1,898,992 | 2/1933 | Guest et al. ....................... 426/474 |
| 2,918,378 | 12/1959 | Joiner ................................. 426/564 |
| 4,104,413 | 8/1978 | Wynn et al. ...................... 426/582 |
| 4,110,484 | 8/1978 | Rule et al. ........................ 426/582 |
| 4,315,949 | 2/1982 | Schroder .......................... 426/564 |
| 4,623,551 | 11/1986 | Giddey et al. ................... 426/582 |
| 4,668,520 | 5/1987 | Okonogi et al. ................. 426/564 |
| 4,676,926 | 6/1987 | Kappler ............................ 426/564 |
| 4,719,113 | 1/1988 | Kharrazi .......................... 426/582 |

FOREIGN PATENT DOCUMENTS

| | | | |
|---|---|---|---|
| 0172787 | 2/1986 | European Pat. Off. ............ 426/564 |
| 2808826 | 9/1978 | Fed. Rep. of Germany ...... 426/582 |
| 3314551 | 11/1984 | Fed. Rep. of Germany . |
| 2165202 | 8/1973 | France . |
| 2450064 | 9/1980 | France . |
| 2537403 | 6/1984 | France ............................... 426/582 |
| 0002653 | 1/1984 | Japan ................................. 426/582 |
| 2215341 | 9/1987 | Japan ................................. 426/582 |
| 8402180 | 2/1985 | Netherlands ....................... 426/582 |
| 2082890 | 3/1982 | United Kingdom ................ 426/582 |

*Primary Examiner*—Virginia Mancharan
*Attorney, Agent, or Firm*—Young & Thompson

[57] ABSTRACT

A process for the manfacture of a processed cheese or a processed cheese speciality with an original supple texture similar to that of original cheeses and possessing holes in the cheese visible to the naked eye, by beating of a melted cheese while still hot in the presence of an inert gas so as to cause the cheese to swell followed by the partial reduction in volume of the whipped cheese so obtained while still hot and rapid cooling of the product obtained.

7 Claims, No Drawings

MANUFACTURING PROCESS FOR PROCESSED CHEESES WITH AN ORIGINAL TEXTURE AND PROCESSED CHEESE OBTAINED BY THIS PROCEDURE

The present invention relates to the area of foodstuffs and more particularly to a process for the manufacture of processed cheese or processed cheese specialities with an original texture.

In a more specific manner, it relates to the manufacture of processed cheese or to processed cheese specialities, the appearance and texture of which are similar to those of a cheese produced by traditional manufacture and which has holes in it. The invention also relates to the manufacture of mixed cheeses, the body of which contains distinct elements such as natural cheeses but also cheeses having the appearance of soft cheese or pressed cheese with a bloomy, unwashed rind. The invention relates more specifically to a process for producing the supple and elastic texture, the mat appearance and the holes characteristic of such cheeses. In these latter, the so-called mechanical holes are due to specific practices employed at the stage of curd formation which delay the sealing of the structure; they may be supplemented by holes due to fermentation by specific micro-organisms (leuconostocs). In this category mention may be made of cheeses well-known to the public such as cheeses from the Pyrenees, Camembert, Brie.

By processed cheese or processed cheese speciality is meant products derived mainly from the processing of pressed cheeses to which other milk products may possibly have been added such as milk powder, cream, butter, casein, whey, milk protein concentrates, possibly aromatic concentrates or aromas or even proteins and lipids of plant origin. Melting is usually produced by the addition of an emulsifying agent such as sodium phosphate, polyphosphate or citrate at a concentration of up to 3% by weight. It can also be produced by the addition of other emulsifying additives (example: gums such as guar gum, carob gum, xanthans, etc. . .) incorporated alone or in combination with the emulsifying salts previously mentioned.

Processed cheeses or specialities may also be obtained by using the process described in patent FR-A-2 450 064.

Generally speaking, these processed cheeses or processed specialities, whether they come in the form of blocks, portions, small sections, slices, possess a homogeneous texture, compact and even rigid and brittle, smooth, glossy and without holes. As far as it is known to the applicant, up to present processed cheeses or processed specialities presenting a supple, elastic texture with holes visible to the naked eye have neither been described nor placed on the market.

However, processed cheeses and processed specialities with a special, more supple texture obtained by aeration of the cheese by beating (foaming, whipping) or by incorporation of a suitable gas have been described in the literature and marketed.

In this context it is appropriate to cite FR-A-2 165 202 which describes a process for preparing a whipped processed cheese which consists of subjecting a processed cheese to beating while hot under the pressure of an inert gas in the presence of polyphosphates, the cheese possessing defined characteristics of viscosity which make it possible to produce an optimal coefficient of creaminess.

Mention may also be made of EP-A-0 172 787 which describes a process for the manufacture of cream cheese, the originality of which consists in incorporating a solution of albumin into the mixture under defined conditions in order to improve the creaminess of the product and the stability of the cream. The German patent DE-C-3 114 551 also describes the manufacture of such products with the incorporation of yoghurt or similar fermented milk products, products which according to the inventor confer on the finished product a relatively low pH and a texture quite similar to soft white cheese or a German "quark".

Unfortunately, the products obtained by these different procedures, even if they result in a product having an abundant texture and give an impression of lightness "in the mouth", still maintain a homogeneous texture and a solid, consistent appearance; in fact, the mousse-like structure (presence of small holes) is scarcely visible to the naked eye. In no case do these technologies result in the manufacture of products presenting supple, elastic textures with holes similar to those formed mechanically or by fermentation in certain cheeses (Brie, Camembert, those from the Pyrenees).

Now, in a quite unexpected manner, the applicant has discovered that by causing a processed cheese to swell while hot followed by a partial reduction of the swelling while still hot, it is possible to confer on the processed cheese a supple, elastic texture in which holes are present similar to the traditional, mechanical holes found in cheese.

The subject of the present invention is thus a manufacturing process for a processed cheese or processed cheese speciality with a supple, original texture, similar to those of traditional cheeses and possessing holes visible to the naked eye, characterized in that a processed cheese is beaten while hot in the presence of an inert gas so as to cause the cheese to swell, the whipped cheese thus obtained is subjected to a partial reduction in volume while still hot and the product obtained is cooled rapidly.

The products produced by means of this process also form part of the subject of the present invention.

Thus, the present invention makes it possible to confer on conventional processed cheeses or processed specialities the appearance of traditional cheeses by creating in the cheese holes visible to the naked eye (usually being at least 0.5 mm in diameter).

Owing to the present invention, it is possible to obtain novel products of very attractive appearance to the customer and to extend the range of products belonging to the family of processed cheeses and processed specialities. Furthermore, the process developed by the applicant is simple to perform and easy to apply on an industrial scale. In particular, it makes possible the continuous production of processed cheeses. For carrying out this process, the applicant has made use of the traditional methods of whipping. Another advantage of the invention is the preparation of products which can be conserved for longer than the corresponding natural cheeses with stable organo-leptic properties.

In the present invention the raw material is a processed cheese. This processed cheese can be prepared in accordance with the processes traditionally used for the processing of cheese and abundantly described in the literature (thus, the chapter "Processed cheeses" from the book by ECK / Cheese—Paris, Lavoisier, 1986 may be cited). It should be quite clear that it is possible to use as raw material all of the raw materials usually used for the manufacture of processed cheeses (soft cheeses, pressed cheeses, fresh curds, butterfat, ultrafiltration concentrates of milk proteins, etc).

Usually an emulsifying agent is added to these raw materials and they are heated with agitation usually at a temperature varying between 70° and 150° C. in order to give rise to a melted cheese paste. The melted paste obtained preferably has a dry extract content of between 35 and 60%, a fat content of 5 to 40% and a content of soluble nitrogenous matter of 1.5 to 4%.

The melted cheese is then beaten while still hot in an inert gas such as nitrogen. This beating operation is advantageously performed at a temperature varying from 70° to 95° C., and preferably between 75° and 85° C.

It is under these conditions of temperature that the desired degree of swelling is optimal and that the creaminess is best attained owing to the relatively fluid state of the melted mass because a lower temperature leads to a product with too high a viscosity to be effectively aerated by the gas and to lead to satisfactory swelling, and a higher temperature confers on the product too fluid a texture which leads to its not retaining the gas incorporated, the result of the beating being in fact the preparation of a whipped cheese which is not sufficiently stable to be subsequently reduced in volume.

The beating is advantageously carried out under a pressure of from 2 to $5 \times 10^5$ Pa in a manner leading to the incorporation of a quite considerable volume of gas while furnishing a mousse sufficiently unstable to undergo a subsequent reduction in volume.

During the beating the inert gas such as nitrogen is advantageously incorporated in a proportion such that the relative density of the product obtained lies between 0.7 and 0.8 (relative density refers to the ratio of the density of the product obtained to that of the unwhipped product having the same composition).

The whipping can be performed in any type of industrial appliance designed for that purpose. The appliances Mondomix and Burdosa may be given as examples. In the case of the Mondomix appliance, the conditions for whipping are the following:

rate of beating: 150 to 400 r/min.
incorporation pressure of the gas: 3 to $4 \times 10^5$ Pa.

Subsequently, the whipped cheese paste is subjected to a partial reduction in volume. This partial reduction in volume is advantageously conducted until the relative density lies between 0.8 and 0.9, and is suitably performed with agitation at a speed substantially lower than the speed of beating.

For this purpose the whipped cheese paste may be transferred directly to a vat or a hopper where it is stored for the time necessary for its volume to be partially reduced; the time for this reduction in volume is chosen as a function of the type of holes that one wants to produce. The reduction in volume of the product is carried out advantageously at a temperature between 70° and 95° C., and preferably in the range of 80° C.–90° C., since the rate of reduction can be carefully controlled in this temperature range. Too high a temperature leads to too rapid a reduction and even complete collapse, and if the temperature is too low reduction is too slow or does not occur at all. The time for the reduction in volume lies advantageously between 2–3 minutes for the generation of holes 0.5 mm long and 5 minutes for holes 2 to 5 mm in length.

The intensity of the reduction in volume can also be regulated by adjusting the mechanical agitation in the vats and the hoppers; the vigour of this agitation must be low in order to avoid a too rapid reduction in volume and the appearance of holes of undesirable size.

Another possibility consists of packaging the whipped cream paste while it is still hot, for example at a temperature of 85° to 90° C., then of placing the packaged whipped cheese in an enclosure having a temperature of about 80°–120° C. for 15 to 60 minutes. The temperature and the time are a function of the size of the cheese. This process is used advantageously for the manufacture of mixed cheeses since it makes possible a thermization of the product.

In the case in which such packaging is not carried out beforehand, then the product is packaged after reduction in volume, when it has acquired the texture and holes of the desired size, in small dishes, portions of aluminium, blocks intended for slicing or in any other suitable size and packaging. It is obvious that the form of the finished product is not limited and may be cylindrical, cubic, triangular, conical, spherical, parallelipiped, oval, etc . . .

The packaged product is then subjected to rapid cooling to a temperature equal to or lower than 20° C. in order to freeze the structure produced; the time and temperature of cooling in the cooling chamber are chosen as a function of the size of the product; thus a block of 1.5 kg needs to be placed at 6° C. for 8 h for its centre to reach 20° C. whereas the centre of a piece weighing 200g will reach 20° C. after 2 h at 6° C.

The product may be left with its natural flavor or it may be flavored by the addition of traditional seasonings (pepper, caraway seeds, onions, etc . . .), aromatic concentrates (tomatoes, peppers, cheeses, shellfish etc) or any other aromatic substance known to or used in such manufactures.

Particularly advantageous examples consist of incorporating into the melt of the raw materials a cheese with a distinctive taste (blue cheeses, for example) or of manufacturing a mixed cheese by incorporating into the partially whipped melted mass obtained pieces or slices of a particularly attractive natural cheese (blue cheese, mimolette) in order to produce a particularly attractive and original cheese for the consumer.

Another particularly advantageous embodiment consists in subjecting the product after cooling but before packaging to an inoculation of its surface with microorganisms of ripening and in allowing the micro-organisms to grow under defined conditions of temperature and humidity so as to produce a surface bloom similar to that existing on traditional cheeses with a bloomy, unwashed rind or a washed rind.

In the implementation of this process use can advantageously be made of the technique described in EP-A-0 133 402 which consists essentially of carrying out, prior to the seeding, an acidification treatment, in particular to a pH between 4 and 5. In addition, according to this technique the constituents of the cheese base are advantageously chosen so that the melted cheese paste has a composition and condition similar to those of a coagulum destined to be transformed into cheese according to the traditional methods.

As a result of employing this simple procedure, processed cheeses and processed specialities are finally obtained with a supple, elastic texture and possessing holes similar to those found in natural cheeses but they may be preserved for a much longer time than these latter and the organo-leptic properties of which are perfectly stable.

The following examples illustrate the process according to the invention.

EXAMPLE 1

A mixture of Cheddar cheese from the Pyrenees, casein, milk, butter, cooking salt and emulsifying salts is prepared in the following proportions:

| Cheddar | 48% by weight |
| --- | --- |
| Cheese from the Pyrenees | 15% by weight |
| Casein | 2% by weight |
| Skimmed milk | 2% by weight |
| Butter | 10% by weight |
| Na Cl | 1% by weight |
| Emulsifying salts | 2% by weight |
| Water | make up to 100% | in a manner so as to obtain after fusion at 110° C. a mixture, the dry extract content, the fat content, the content of total nitrogenous matter and the content of soluble nitrogenous matter of which are as follows:

| Fat | 50% (DE) |
| --- | --- |
| Dry extract | 53% |
| Total nitrogenous matter | 18% |
| Soluble nitrogenous matter | 3% |

The composition obtained is that of a pressed cheese of the type of a cheese from the Pyrenees.

The total mixture is melted at a 110° C. for about 3 minutes in a cutter. The mixture is cooled to 85° C. and the mass obtained is whipped in a mixer of the Mondomix type under a pressure of nitrogen of $3 \times 10^5$ Pa at a rotor speed of 400 r/min. A whipped product having a relative density of 0.75 is obtained. The whipped product is transferred to a vat with gentle agitation (5 r/m) for 3 minutes. A whipped product partially reduced in volume and having a relative density of 0.8 is obtained. The hot mixture is then poured into molds. They are cooled rapidly in a chamber at 2° C. (2 h to 6 h) so that the cheese attains a temperature of from 8° to 12° C. A cheese product is obtained having holes of about 0.5 mm.

The products are then removed from the molds and a plastic coating material or a coating wax is deposited on the surface. The product has the appearance of a pressed cheese and a cross-section reveals many small holes of about 0.5 mm and well distributed. This product can be conserved for about 6 months.

EXAMPLE 2

A mixture is prepared having the following composition:

| Cheddar | 24% by weight |
| --- | --- |
| Soft cheese (Brie - Camembert) | 20% by weight |
| Cream | 26% by weight |
| Caseinate | 6.6% by weight |
| Na Cl | 1% by weight |
| Xanthan gum | 0.2% by weight |
| Carob gum | 0.2% by weight |
| Water | make up to 100% | so as to obtain a mixture, the dry extract and fat contents of which are those of a soft cheese rich in fat, namely:

| Dry extract | 50% |
| --- | --- |
| Fats/DE | 60% |
| Total nitrogenous matter | 14% |
| Soluble nitrogenous matter | 2% |

The total mixture is heated at 80° C. for 2 minutes in a cutter. The pH is 5.3. The melted cheese is whipped continuously in a Mondomix mixer under a pressure of nitrogen of $4 \times 10^5$ Pa at a rotor speed of 200 r/min. so as to give rise to a whipped product having a relative density of 0.7. The product is then re-heated to 90° C. in a scraped surface exchanger with gentle agitation.

The hot mixture is poured after being maintained in the hopper for 5 minutes at 90° C. during which time a partial reduction in volume is brought about. The product thus partially reduced in volume has a relative density of 0.9. The product is cooled rapidly (2 h) in a chamber at 40° C., then in a chamber at 6° C. for 6 h to 48 h. The cooled product obtained has holes of from 2 to 4 mm in length.

After being removed from the mold, a 2% suspension of lactic ferment is sprayed onto the external surfaces of the cheese and it is left to acidify for 2 to 6 hours until a pH of 4.6 is attained at the surface. A suspension of Penicillium Candidum having a concentration of $10^5$ to $10^7$ spores/ml is then sprayed onto the surface.

The cheeses are then placed in the cellar where they are to ripen for 8 days. Once packaged, the cheeses are ready for sale. The growth of the Penicillium gives the appearance of a bloomy, unwashed rind, and the presence of elongated and irregular holes (2 mm to 4 mm) confers on them the appearance of traditional cheeses of the soft cheese type.

EXAMPLE 3

A creamy melted mass similar to that of Example 2 is used in which the soft cheeses are replaced by a blue cheese and the gums by emulsifying salts.

The molten cheese is whipped at a temperature of 80° C. in a Mondomix mixer under a pressure of nitrogen of $2.5 \times 10^5$ Pa with gentle agitation (200 to 300 r/min.). A whipped product is obtained having a relative density of 0.75. This product is poured into molds and slices of blue cheese which has been cut up and from which the rind has been removed (this cheese was prepared from pasteurized milk and has a dry extract content of 50% by weight) are placed alternately between the layers of processed cheese.

When filled, the molds are closed. They are then placed in an oven so as to maintain the cheeses at a temperature of 80° C. for 15 minutes to 1 hour; during this thermization a reduction in volume occurs. The cheeses are then cooled rapidly to 6° C..

The next day the cheeses are removed from the molds and subjected to a surface treatment similar to that described in Example 2. Then a suspension of Penicillium Candidum is sprayed onto the surface. The cheeses are then allowed to ripen in accordance with a soft cheese technology.

The holes distributed throughout the mass and the presence of Penicillium on the surface confer on the product a supple and creamy texture and the appearance of a cheese with a bloomy, unwashed rind.

We claim:

1. Process for the manufacture of a processed cheese or a processed cheese specialty with a soft texture and possessing holes in the cheese which are at least 0.5 mm in diameter, comprising beating a processed cheese at a temperature between 70° C. and 95° C. and at a pressure of 2 to $5 \times 10^5$ Pa in the presence of an inert gas so as to cause the cheese to swell such that the ratio of the density of the whipped cheese to the unwhipped cheese is about 0.7 to about 0.8, then subjecting the whipped cheese so obtained to a partial reduction in volume while still at a temperature between 70° C. and 95° C. for a period of from 2 to 5 minutes and then cooling the product obtained at a temperature not more than about 20° C. thereby to freeze the product.

2. Process according to claim 1, comprising the performance of the beating at a temperature between 75° and 85° C.

3. Process according to claim 1, comprising a partial reduction in volume until the ratio of the density of the whipped product to the unwhipped cheese is 0.8 to 0.9.

4. Process according to claim 1, comprising the carrying out of the reduction in volume at a temperature between 80° and 90° C.

5. Process according to claim 1 comprising the performance of the reduction in volume with agitation at a speed substantially lower than the speed of beating.

6. Process according to claim 1 comprising the packaging of the whipped cheese paste prior to cooling, followed by partial reduction in volume by maintaining the packaged composition in a chamber at a temperature varying between 80° and 120° C. for 15 to 60 minutes.

7. Process according to claim 1 wherein the cooling of the product partially reduced in volume to a temperature not more than about 20° C. is effected for at least 1 hour.

* * * * *